United States Patent
Willems et al.

(10) Patent No.: US 10,885,032 B2
(45) Date of Patent: Jan. 5, 2021

(54) QUERY EXECUTION PIPELINING WITH SHARED STATES FOR QUERY OPERATORS

(71) Applicant: SAP SE, Walldorf (DE)

(72) Inventors: Paul Willems, Heidelberg (DE); Timm Steinbeck, Neckargemuend (DE)

(73) Assignee: SAP SE, Walldorf (DE)

( * ) Notice: Subject to any disclaimer, the term of this patent is extended or adjusted under 35 U.S.C. 154(b) by 496 days.

(21) Appl. No.: 15/363,531

(22) Filed: Nov. 29, 2016

(65) Prior Publication Data

US 2018/0150513 A1    May 31, 2018

(51) Int. Cl.
  *G06F 16/00*    (2019.01)
  *G06F 16/2453*  (2019.01)
  *G06F 16/2455*  (2019.01)

(52) U.S. Cl.
  CPC .... *G06F 16/24542* (2019.01); *G06F 16/2455* (2019.01)

(58) Field of Classification Search
  CPC .............. G06F 16/24542; G06F 16/2455
  See application file for complete search history.

(56) References Cited

U.S. PATENT DOCUMENTS

| | | | |
|---|---|---|---|
| 5,761,652 A | 6/1998 | Wu | |
| 5,918,225 A | 6/1999 | White et al. | |
| 6,374,236 B1 | 4/2002 | Chen et al. | |
| 7,174,553 B1 | 2/2007 | Reed et al. | |
| 7,337,174 B1 | 2/2008 | Craig | |
| 7,797,342 B2 | 9/2010 | Banks et al. | |
| 7,805,456 B2 | 9/2010 | Meijer et al. | |
| 8,977,600 B2 | 3/2015 | Crupi et al. | |
| 9,165,021 B2 | 10/2015 | Bhattacharjee et al. | |
| 9,298,768 B2 | 3/2016 | Varakin et al. | |
| 9,495,207 B1* | 11/2016 | Pjesivac-Grbovic | ... G06F 9/546 |
| 2001/0037322 A1 | 11/2001 | Lindsay et al. | |
| 2002/0035559 A1 | 3/2002 | Crowe et al. | |
| 2004/0015511 A1 | 1/2004 | Seefeldt et al. | |
| 2004/0078364 A1 | 4/2004 | Ripley et al. | |

(Continued)

FOREIGN PATENT DOCUMENTS

EP    2930629    10/2015

OTHER PUBLICATIONS

Google Search (Year: 2007).*

(Continued)

*Primary Examiner* — Mark D Featherstone
*Assistant Examiner* — Kweku William Halm
(74) *Attorney, Agent, or Firm* — Mintz Levin Cohn Ferris Glovsky and Popeo, P.C.

(57) ABSTRACT

A system for query execution and planning with pipelining and shared states for query operators is provided. In some implementations, the system performs operations comprising identifying a plurality of operators for executing a query and generating an indication that a first operator and a second operator share information when the first operator and the second operator require the same data which is not present when the query is received. The operations can further include executing the first operator to generate at least a portion of the data, storing the data in a location based upon the indication, and providing, based upon the indication, the stored data for the second operator. Related systems, methods, and articles of manufacture are also described.

13 Claims, 7 Drawing Sheets

(56) References Cited

U.S. PATENT DOCUMENTS

| | | |
|---|---|---|
| 2004/0162822 A1 | 8/2004 | Papanyan et al. |
| 2004/0230559 A1 | 11/2004 | Newman et al. |
| 2005/0028134 A1 | 2/2005 | Zane et al. |
| 2005/0080755 A1 | 4/2005 | Aoyama |
| 2005/0138000 A1 | 6/2005 | Roux et al. |
| 2007/0203893 A1* | 8/2007 | Krinsky ............... G06F 16/951 |
| 2007/0239797 A1 | 10/2007 | Cattell |
| 2007/0250470 A1 | 10/2007 | Duffy et al. |
| 2008/0033960 A1 | 2/2008 | Banks et al. |
| 2008/0098053 A1 | 4/2008 | Miao et al. |
| 2008/0281786 A1 | 11/2008 | Duffy et al. |
| 2008/0281846 A1 | 11/2008 | Hoang et al. |
| 2009/0006429 A1 | 1/2009 | Champion et al. |
| 2009/0030874 A1 | 1/2009 | Das et al. |
| 2009/0228434 A1* | 9/2009 | Krishnamurthy ........................... G06F 16/24568 |
| 2009/0259644 A1* | 10/2009 | Scheuermann ... G06F 16/24542 |
| 2010/0114973 A1 | 5/2010 | Goyal |
| 2010/0131550 A1 | 5/2010 | Nakadai |
| 2010/0262633 A1 | 10/2010 | Bhattacharjee |
| 2010/0281017 A1 | 11/2010 | Hu et al. |
| 2011/0066668 A1 | 3/2011 | Guarraci |
| 2012/0084315 A1 | 4/2012 | Schneider et al. |
| 2013/0054630 A1 | 2/2013 | Briggs et al. |
| 2013/0073573 A1 | 3/2013 | Huang et al. |
| 2013/0151502 A1 | 6/2013 | Yoon et al. |
| 2014/0081950 A1 | 3/2014 | Rajan |
| 2014/0089294 A1 | 3/2014 | Shankar et al. |
| 2014/0108861 A1 | 4/2014 | Abadi et al. |
| 2014/0172914 A1* | 6/2014 | Elnikety ............ G06F 16/9024 707/774 |
| 2014/0280030 A1 | 9/2014 | Freedman et al. |
| 2014/0280037 A1 | 9/2014 | Petride et al. |
| 2014/0351233 A1 | 11/2014 | Crupi |
| 2015/0026154 A1 | 1/2015 | Jeong et al. |
| 2015/0178305 A1 | 6/2015 | Mueller et al. |
| 2015/0186461 A1 | 7/2015 | Nica |
| 2015/0193500 A1 | 7/2015 | Aute et al. |
| 2015/0261820 A1* | 9/2015 | Cheng ............... G06F 16/24544 707/718 |
| 2015/0269228 A1 | 9/2015 | Fisher et al. |
| 2016/0055348 A1 | 2/2016 | Lewak |
| 2016/0098448 A1 | 4/2016 | McShane |
| 2017/0024433 A1 | 1/2017 | Neelakanthappa et al. |
| 2017/0228425 A1 | 8/2017 | Kandula et al. |
| 2017/0262516 A1* | 9/2017 | Horowitz ............. G06F 16/258 |
| 2017/0308547 A1 | 10/2017 | Gupta |
| 2018/0150513 A1 | 5/2018 | Willems |
| 2018/0150514 A1 | 5/2018 | Willems et al. |
| 2018/0150515 A1 | 5/2018 | Merker |

OTHER PUBLICATIONS

Neumann, Thomas. "Efficiently compiling efficient query plans for modern hardware." Proceedings of the VLDB Endowment 4.9 (2011): 539-550.

Herodotu, Query Optimization techniques for partitioned tables, Jun. 12-16, 2011, pp. 49-60.

Neumann, Efficienttly compiling efficient query plans for modern hardware, Proceedings of the VLDB endowment, 2011, pp. 539-550.

* cited by examiner

QUERY EXECUTION PIPELINING WITH SHARED STATES FOR QUERY OPERATORS

TECHNICAL FIELD

The subject matter described herein relates to database management, and more particularly, query execution and planning with pipelining and shared states for query operators.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance.

SUMMARY

In some aspects, a method, computer program product and system are provided. In an implementation, a database execution engine is provided. The database execution engine can include (or otherwise utilize) a processor and/or memory, which can be configured to perform operations including identifying a plurality of operators for executing a query, the plurality of operators including a first operator and a second operator. The operations can further include generating an indication that the first operator and the second operator share information when the first operator and the second operator require first data which is not present when the query is received. The operations can further include executing the first operator to generate at least a portion of the first data, storing the first data in a location based upon the indication, and providing, based upon the indication, the stored first data for the second operator.

In some variations, the first operator can be generated based on a first coded class definition, the first coded class definition defined to include a first state indicating that the first data is required. The second operator can similarly be generated based on a second coded class definition, and the second coded class definition can be defined to include a second state indicating that the first data is required. The indication can comprise an indication that the first state and the second state are shared.

In some aspects, the first data comprises a data table. The query can be received from an application separate from the database execution engine. In some variations, the operations can include generating a query plan for execution of the query, the query plan comprising the plurality of operators and the indication. In some variations, the operations can include storing the generated first data in a predetermined memory location, wherein providing the stored first data for the second operator comprises providing access to the predetermined memory location. In some implementations, the first data can be removed from the predetermined memory location after it is consumed by the second operator. In some implementations, the first operator can be included in a first query execution pipeline and/or the second operator can be included in a second query execution pipeline which begins at, or after an end of, the first query execution pipeline.

In some implementations, at least a portion of the plurality of operators can be split among a plurality of pipelines including a first pipeline and a second pipeline. The plurality of pipelines can be executed in a determined order to (e.g., ultimately) generate results responsive to the query. Executing the first pipeline can comprise iteratively generating one or more blocks of data based upon operations contained within the first pipeline and/or storing the one or more blocks as intermediate results for the second pipeline. The second pipeline can perform similar operation and/or use the intermediate results. In some aspects, the database execution engine can be configured to provide query optimization of the query plan and/or select other execution engines to handle certain queries.

Implementations of the current subject matter can include systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Database management systems and operations performed on the data managed by a database management system have become increasingly complex. For example, a database management systems (or database for short) can support relatively complex online analytical processing (OLAP, which can perform multi-dimensional analysis) to more straightforward transaction based online transaction processing (OLTP). Moreover, the database may be configured as a row-store database or column store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

From an application or client perspective, it can be extremely cumbersome to access databases. For example, an application may need to query different types of databases using complex queries. As a consequence, the application layer in this example would need to be configured to handle the various types of databases and the various query types. Additionally or alternatively, each database may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database and may thus reduce the performance and response times for queries on that database layer.

In some example implementations, there may be provided an execution engine that may decouple the higher-level, application layer from the database layer (e.g., the persistence or storage layer where data including database tables may be stored and/or queried using instructions, such as commands and/or the like). The execution engine may be implemented separately from the database layer and/or the application layer. Furthermore, the execution engine may be configured to receive a query, generate a query plan (including for example query algebra), optimize the query plan, and/or generate executable code, which can be executed at runtime. The executable code may include pre-compiled code (which can be selected for certain operators in the query plan) and/or code that is generated just-in-time specifically for execution of the query plan.

The execution engine may be configured to perform some operations itself, while the execution engine may send some operations (e.g., relatively basic commands, such as reads, writes, scans, and/or the like) to the database layer. Furthermore, the execution engine may receive corresponding responses from the database layer where data is stored/persisted and certain commands, such as reads, writes, scans, and/or the like, can be performed. The execution engine may perform more complex execution operations, such as rule-based operations including relatively more complex operations such as joins, projections, and/or the like, while accessing the database's storage/persistence layer when needed to read, write, update, and/or perform other operations.

The execution engine may be configured to support a wide range of database types to reduce, if not eliminate, the need for specialized execution engines for each type of database. For example, rather than having an execution engine for each type of database (e.g., an execution engine for an OLAP database, another execution engine for an OLTP database, an execution engine for a row-store database, an execution engine for a column-store database, and/or the like), the execution engine disclosed herein can perform query execution for a variety of database types and send queries to the different types of database layers (and/or their storage/persistence layer) and handle the corresponding responses.

Figure 1:
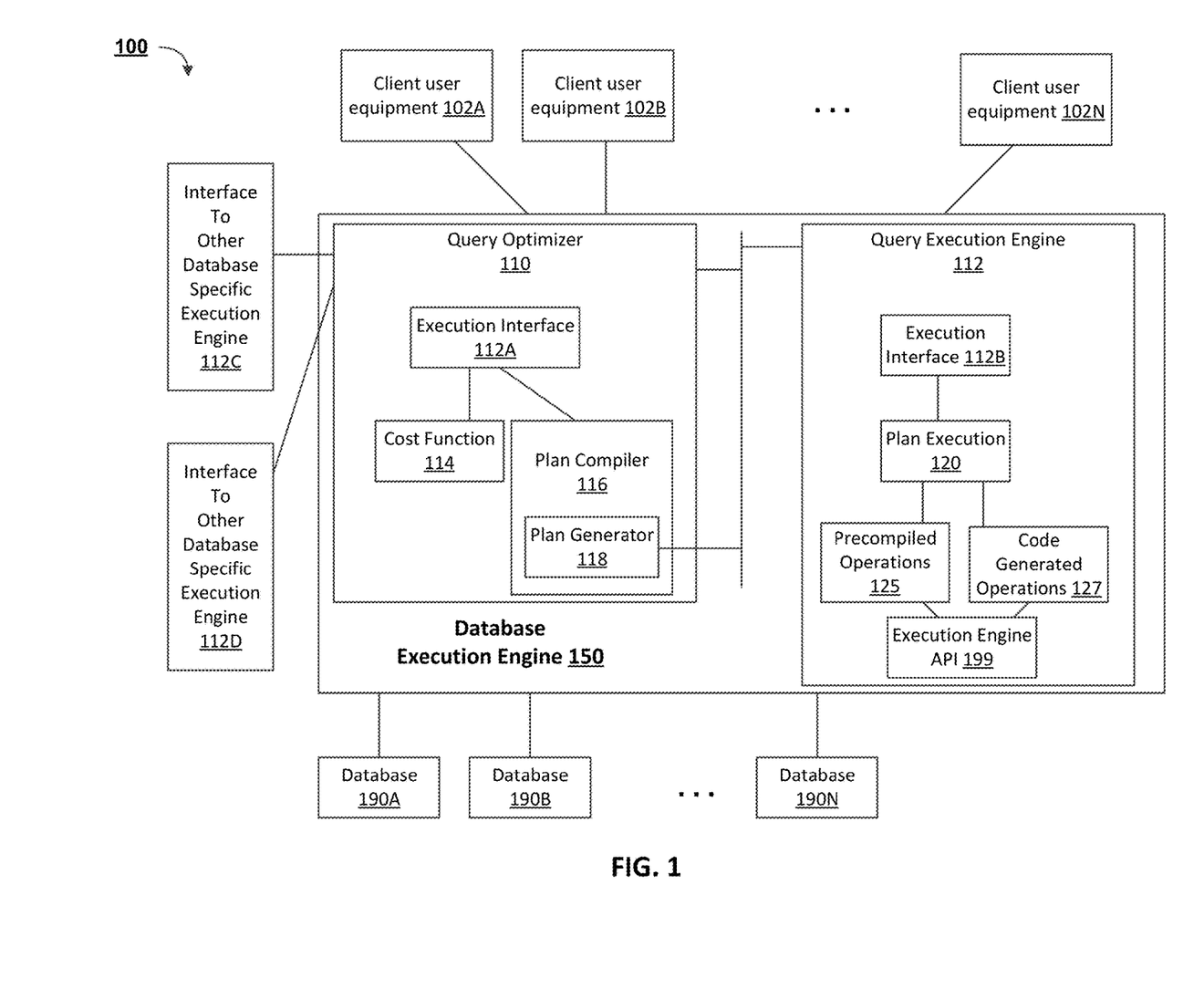
FIG. 1 depicts a block diagram of a system for query planning and/or execution, in accordance with some example implementations.

FIG. 1 depicts a block diagram of a system 100 for query planning and/or execution, in accordance with some example implementations. As illustrated, the system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 1, the databases 190A represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via an execution engine 150 to the database layer 190A-B, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or another type of optimizer, to receive at least one query from a user equipment and generate a query plan (which may be optimized) for execution by the execution engine 112. The query optimizer 110 may receive a request, such as a query, and then form or propose an optimized query plan. The query plan (which may be optimized) may be represented as a so-called "query algebra" or "relational algebra."

For example, SELECT Columns A and B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query plan optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimum query plan, which may represent a query algebra, as noted above. To compile a query plan, the query optimizer 110 may provide the query plan to the query plan compiler 116 to enable compilation of some, if not all, of the query plan. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler may select pre-compiled code for a given operation as part of the optimization of the query plan, while for another operation in the query plan the plan compiler may allow a compiler to generate the code. The pre-compiled and generated code represent code for executing the query plan, and this code may be provided to the plan generator 118, which interfaces the query execution engine 112.

In some implementations, the query optimizer 110 may optimize the query plan by compiling and generating code. Moreover, the query optimizer 110 may optimize the query plan to enable pipelining during execution.

In some implementations, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, compiled code to enable execution of the optimized query plan, although the query execution engine may also receive code or other commands directly from a higher-level application or other device, such as user equipment 102A-N.

The query execution engine 112 may then forward, via an execution interface 112B, the code to a plan execution engine 120. The plan execution engine may then prepare the plan for execution, and this query plan may include pre-compiled code 125 and/or generated code 127. When the code for the query plan is ready for execution during runtime, the query execution engine 112 may step through the code performing some of the operations within the database execution engine 150 and sending some of the operations (or commands in support of an operation, such as a read, write, and/or the like) to the execution engine application programming interface (API) for execution at one or more of databases layers 190A-N.

Table 1 below depicts an example of a query execution plan including a (1) TableScan (Filter X=1) and a (2) Materialization (Columns A, B). In this example, the TableScan would result in one or more calls via the execution engine API 199 to one or more of databases 190A-B. Specifically, the TableScan operator at Table 1 would result in a call for a dictionary look up for a value "X" and an indexvector scan with a valueid obtained from the dictionary look up, which results in a document ID list. Then for each document ID, a call is made via 199 to look up the value IDs for columns A and B. The value IDs may be used to look up dictionary values to materialize, the columns A and B including the actual data values for those columns.

TABLE 1

| Operator | Calls made on Database API |
| --- | --- |
| 1) TableScan (Filter X = 1) | dictionary lookup for value "X" indexvector scan with a valueid from the lookup, which results in a document ID (docid) list |
| 2) Materialization (Columns A, B) | For each docid, lookup value IDs (valueids) for columns A + B For the valueids, lookup dictionary value in dictionaries of A and B |

In some implementations, the query execution engine 150 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 150 may perform execution related to handling the differences between these two types of databases. This may enable a reduction in processing at the database layer 190A-N. Moreover, the query execution engine 150 may perform other operations including rule-based operations, such as joins and projections, as well as filtering, group by, multidimensional analysis, and/or the like to reduce the processing burden on the database layer. In this way, the query execution engine 150 may execute these and other complex operations, while the database's persistence/storage layer 190A-N can perform simpler operations to reduce the processing burden at the database's persistence/storage layer 190A-N.

In some example implementations, the query execution engine 150 may run, as noted above, just-in-time code 127 generated for some query operations, while pre-compiled code 125 may be run for other operations. Moreover, the query execution engine 150 may combine the generated code 127 with precompiled code 125 to further optimize execution of query related operations. In addition, the query execution engine 150 may provide for a plan execution framework that is able to handle data chunk(s), pipelining, and state management during query execution. Furthermore, the query execution engine 150 may provide the ability to access table storage via an abstract interface to a table adapter, which may reduce dependencies on specific types of storage/persistence layers (which may enable use with different types of storage/persistence layers).

In some example implementations, the database execution engine 150 may be provided with at least one table adapter. In some example implementations, the table adapter may generate an object, such as a table object, which can be stored in cache with other code, objects, and/or the like awaiting runtime execution of the query. In some example implementations, and the table object can be opened, during query execution, to provide access to a table stored in the persistence layer of a database.

Figure 2:
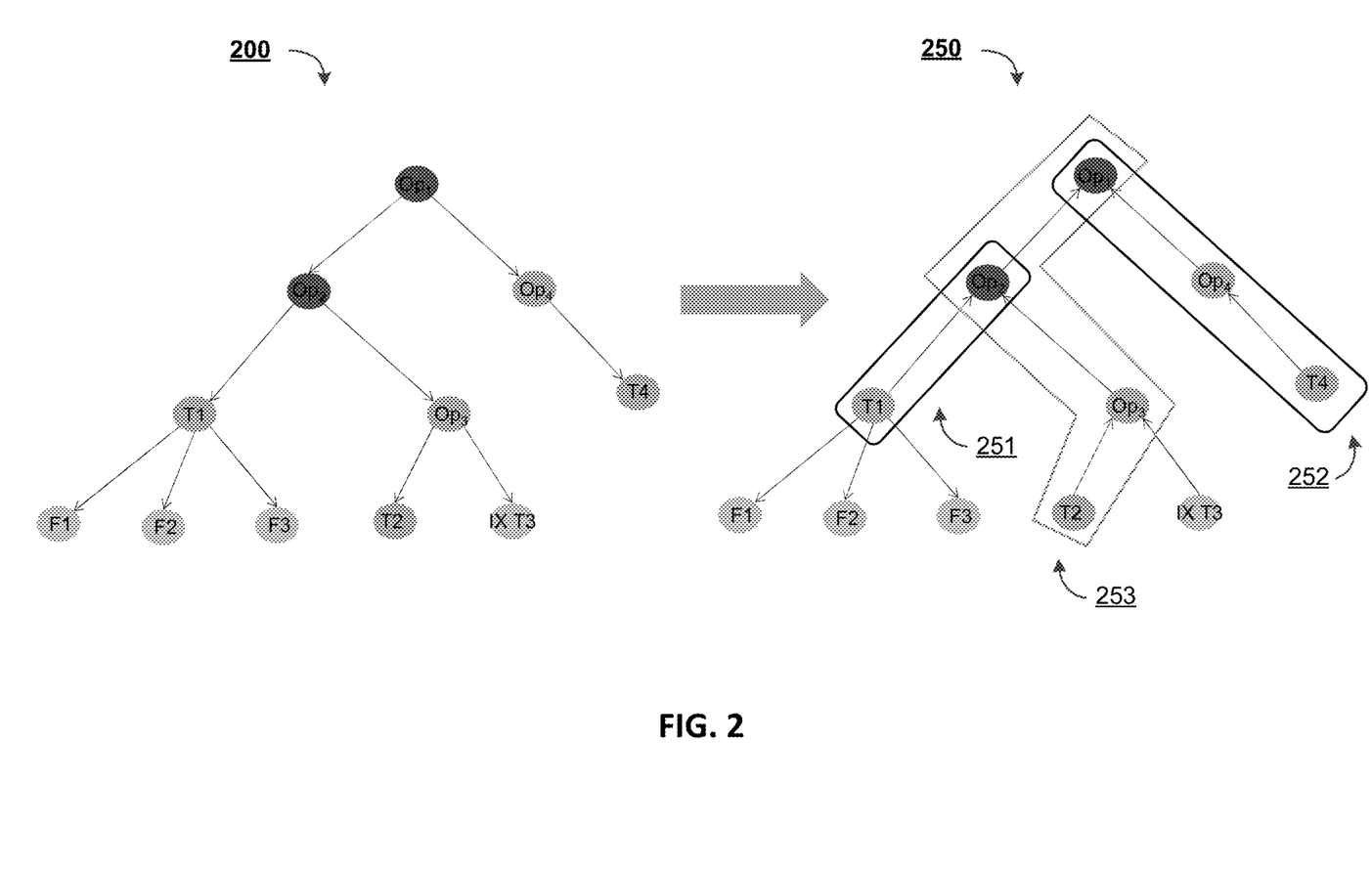
FIG. 2 depicts example query execution flow diagrams with and without pipelining, in accordance with some example implementations.

FIG. 2 depicts example query execution flow diagrams 200, 250 with and without pipelining, in accordance with some example implementations. As illustrated, the first query execution flow diagram 200 includes operators and table structures laid out in a hierarchical structure. The structure of the first query execution flow diagram 200 can be dependent upon the operators present within a query and/or tables utilized by the query. For example, as illustrated, operator $Op_1$ can be a function of operators $Op_2$ and $Op_4$ (e.g., a join, a hashjoin, or another function of two nodes). Operator $Op_2$ can be a function (e.g., a hashjoin) of table T1 and operator $Op_3$. Operator $Op_3$ can be a function of tables T2 and T3. For example, IX T3 can be an index lookup of table T3 and/or operator $Op_3$ can be a join of table T2 and the results of the index lookup on table T3. As illustrated, operator $Op_4$ can be a function of table T4 (e.g., a filter of table T4).

In some aspects, one or more of the tables T1-4 can be table scan operators. In some aspects, table scan operators can retrieve results from an underlying data table (e.g., a column store database/table), in a sequential manner, and/or based on one or more functions (e.g., filters). As illustrated, table T1 can be a table scan operator on an underlying table, based on functions F1-3. Although not illustrated, one or more of the remaining tables T2-4 can be table scan operators based on any number of filters (including zero).

In some implementations, the first query execution flow diagram 200 can be generated by translating a query into a (physical) algebraic expression and/or evaluating the query/expression. In some aspects, the first query execution flow diagram 200 can just be a visual representation of the query/expression, which may instead exist in the form of programming code. In some database systems, the first query execution flow diagram 200 can be executed through volcano style processing (e.g., via an iterator model), where each operator can produce a tuple stream from its input and/or allow for iterating over the tuple stream by repeatedly calling the next function of the operator. Accordingly, in some aspects, parent nodes in the first query execution flow diagram 200 can be regarded as "pulling" results from their child nodes. For example, in some aspects, the operator $Op_1$ may produce tuples by first repeatedly asking its left input (operator $Op_2$) for tuples, placing the received tuples in a hash table, repeatedly asking its right input (operator $Op_3$) for tuples, and/or probing the hash table for each tuple. The input sides could act in a similar manner, recursively asking for tuples from its child nodes and so on. However, although this approach can be simple to implement, it can consume more CPU than necessary (potentially thousands to even millions of times more than necessary), which can be due to poor cache locality (e.g., information which is necessary during execution is not present within and/or needs to be loaded into a cache) and/or complicated book-keeping (e.g., keeping track of intermediate results).

In order to reduce some of these inefficiencies, pipelining may be used. Pipelining can refer to the use of one or more operators which pass data to their parent operators without copying or otherwise materializing the data. As such, in some aspects, child nodes in the second query execution flow diagram 250 can be regarded as "pushing" results to their parent nodes. For example, instead of pulling tuples up, pipelined operators push tuples towards the consuming operators until the end of the pipeline. In order to decide which operators can be pipelined and/or the distribution of the operators among a plurality of pipelines, the query optimizer 110 (or some portion thereof), for example, can determine which, if any, of the operators in a query are "pipeline breakers."

In some aspects, a pipeline breaker can refer to an operator that takes an incoming tuple out of a CPU register for a given input side and/or materializes at least a portion of (e.g., all) incoming tuples from the input side before continuing processing. In some aspects, pipeline breakers and/or the contents of a given pipeline can be determined on multiple factors, such as whether an operator will spill data out of a cache and/or over into memory (e.g., external to cache memory). For example, in some implementations, operator $Op_1$ and operator $Op_2$ can be pipeline breakers, and/or can be set as the final operations in at least one of the pipeline 251-253. In some implementations, other factors can be used to determine where pipelines start, end, and/or what operators each pipeline contain.

Whatever procedure for generating pipelines is used, as illustrated, a first pipeline 250 can be formed to include table T1 and operator $Op_2$, a second pipeline 252 can be formed to include table T4, operator $Op_3$, and operator $Op_2$, and/or a third pipeline 253 can be formed to include table T2, operator $Op_4$, operator $Op_2$, and operator $Op_1$. When execution reaches the end of a pipeline 251-253, results can be materialized and/or placed within a hash table for the pipeline-breaking operator. For example, the results of the first pipeline 251 can be materialized and/or placed within a hash table for operator $Op_2$, then the results of the second pipeline 252 can be materialized and/or placed within a hash table for operator $Op_2$, and then the results of the third pipeline 253 can be materialized and/or placed within a hash table for operator $Op_1$.

In some aspects, pipelining can be regarded as organizing a query into a hierarchical plan of operators, identifying a plurality of paths within the hierarchical plan (e.g., where each path includes an endpoint operator that lies within another path and/or is shared between two paths), generating and pushing one or more chunks of data up a first path to accumulate results at the endpoint, and/or generating and pushing one or more chunks of data up a second path to generate output results based on the accumulated results from the first path. Additional paths can be present and/or additional generation of chunks can occur, depending upon the query (e.g., depending on how many paths are required to pipeline the operators). In some aspects, a chunk of data can be regarded as generated data which is responsive to an operator, but does not contain all of the data required for execution of the query or pipeline. However, in some implementations, depending upon the operator and/or portion of the database in question, a single "chunk" of data can contain all information responsive to a particular operator. For example, a scan of a small table may only require one chunk of data to be passed through a pipeline.

Non-pipelined query execution can be regarded as organizing a query into a hierarchical plan of operators, recursively calling a first child operator (and potentially its child operators) of the root node until all results of the first child operator are determined and/or stored, recursively calling a second child operator (and potentially its child operators) of the root node until all results of the second child operator are determined and/or stored, and/or processing the results of both child operators based on the root node after the results are determined and/or stored.

The use of pipelining can increase memory locality and/or reduce processing time/effort for database queries, as the number of memory accesses can be reduced. In some implementations, pipelining can take advantage or parallel processing systems and/or techniques. In some aspects, the first query execution flow diagram 200 and/or the second query execution flow diagram 250 can be regarded as at least a portion of a query execution plan. Additional processing and/or code generation can occur before or after the query execution flow diagrams 200, 250 are generated, which can help to optimize processing resources and/or reduce query execution time.

Figure 3:
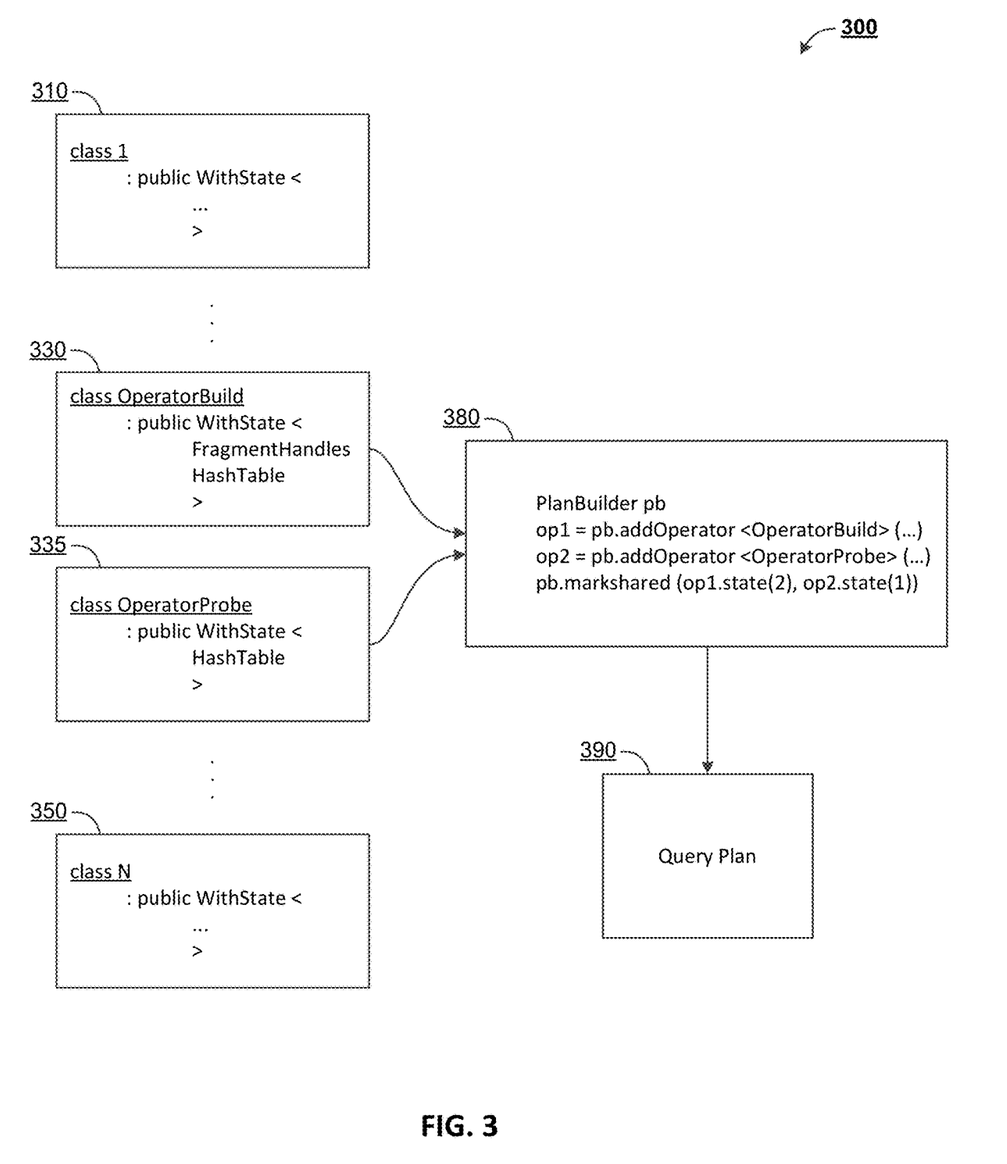
FIG. 3 depicts a block diagram of an example query planning procedure using shared states, in accordance with some example implementations.

In some aspects, one or more of the query operators can utilize data/information which is also used by at least one other query operator. For example, two operators may both need to read/write to the same table. In some aspects, this table can be regarded as a "state" of the two operators. FIG. 3 depicts a block diagram of an example query planning procedure 300 using shared states, in accordance with some example implementations. In some aspects, a state can include any type of info which an operator needs or produces while the query is executed, which may not already be known or present at the time an execution/query plan is produced.

As illustrated, a plurality of operator classes 310-350 can be used to build a query plan 390, based upon query plan building code 380. An operator class can be regarded as a definition for one or more operators. In some aspects, one or more of the operator classes 310-350 can define one or more of the precompiled operators 125 and/or code generated operators 127. Although the precompiled operators 125 and code generated operators 127 are illustrated within the query execution engine 112, they can be utilized during query plan generation and/or optimization. For example, the operator class 310 can define a precompiled operator 125, which is included in a query plan generated by the query optimizer 110 (or some portion thereof, such as the plan generator 118). In another example, the operator class 330 can define a code generated operator 127, which is included in a query plan generated by the query optimizer 110 (or some portion thereof). Other techniques for generating and/or utilizing operator classes 310-350 are possible.

In the illustrated implementation, the build operator class 330 (labeled "OperatorBuild") can define an operator including at least two states: "FragmentHandles" and "HashTable." Similarly, the probe operator class 335 (labeled "OperatorProbe") can define an operator including at least the same HashTable state as the build operator class 330. The operators defined by the operator classes 330, 335 can be processed by the query optimizer 110, for example, which can determine that the operators have at least one state in common: the HashTable state. Operators defined by the operator classes 330, 335 can be added to a query plan 390 and/or the HashTable state can be marked as shared between the operators. The query plan building code 380 provides an example of how the operators can be added to the query plan 390 and/or how the HashTable state can be marked as read.

The class definitions and the code for building the query plan illustrated and described are only examples used to illustrate a portion of query planning. Classes can define operators using different programming languages and/or different syntax, and classes can include more or less information than what is described. For example, each class can be defined to include any number of states (including zero), which can depend upon the query and/or operators processed/executed. Similarly, the code used for building a query plan can be in a different programming language and/or utilize a different syntax, and more or less code may be used for defining a query plan.

Each operator, based on the operator classes 310-350 and utilized (e.g., accessed) by a query, can be added to the query plan 390 and/or analyzed to determine whether there are any shared states among the operators. Once the query plan 390 is generated, it may be provided to and/or executed by the query execution engine 112. Additionally or alternatively, executable code corresponding to the query plan 390 can be generated and/or provided to and/or executed by the query execution engine 112. In some implementations, one or more of the operator classes 310-350, at least a portion of the query plan building code 380, and/or at least a portion of the query plan 390 can be generated and/or utilized by the database execution engine 150, for example.

Figure 4:
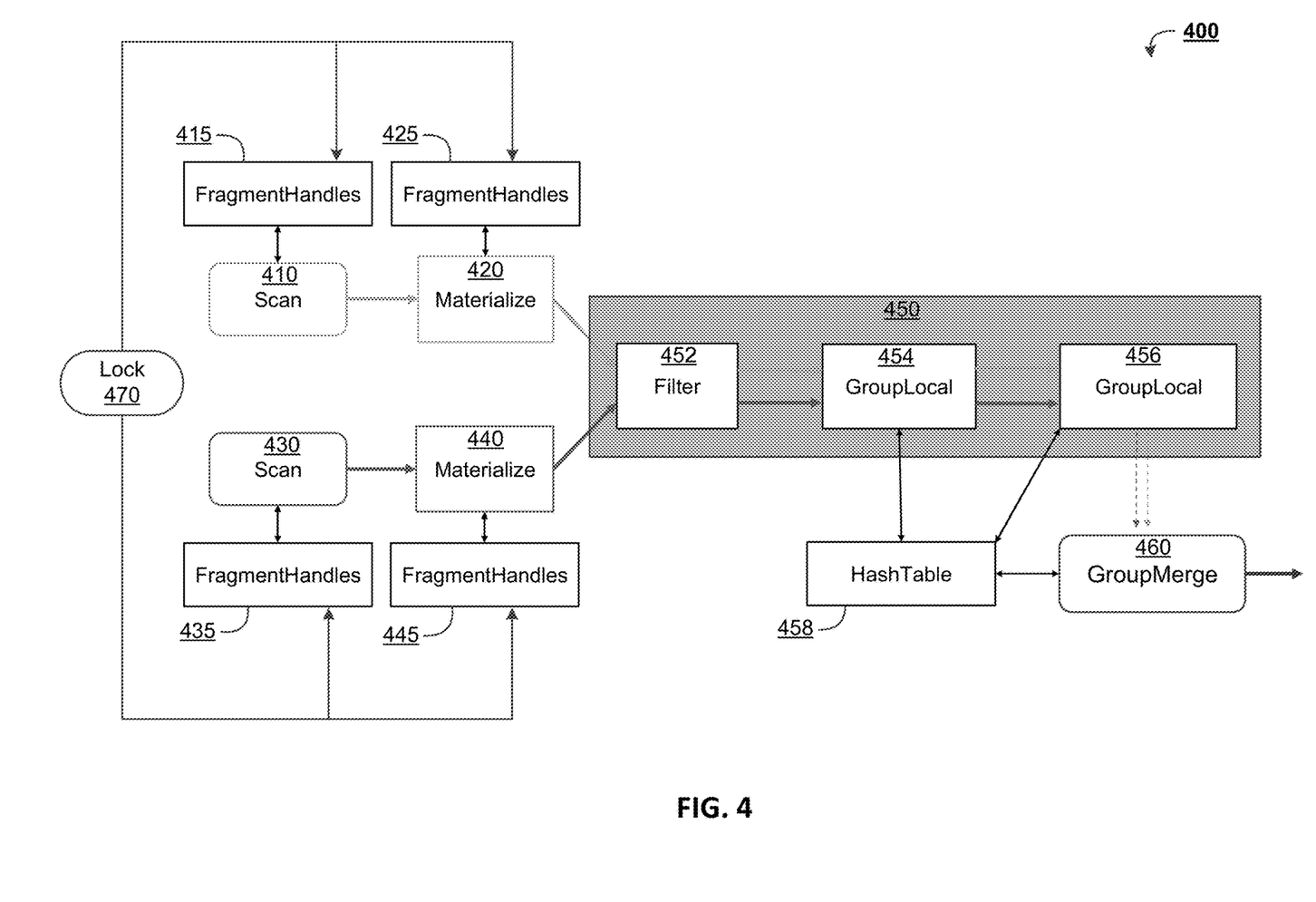
FIG. 4 depicts a block diagram of an example query plan using shared states, in accordance with some example implementations.

FIG. 4 depicts a block diagram of an example query plan 400 using shared states, in accordance with some example implementations. As illustrated, two pipelines can be executed in parallel and an additional pipeline can be executed thereafter. A first pipeline can start with a first scan operator 410, next move to a first materialize operator 420, next move to a filter operator 452, then move to a first group local operator 454, and terminate at/after a second group local operator 456. A second pipeline can start with a second scan operator 430, move next to a second materialize operator 440, move next to the filter operator 452, then move to the first group local operator 454, and terminate at/after the second group local operator 456. A third pipeline can start at a group merge operator 460, and can continue thereafter.

A lock operator 470, which can occur before the start of the first or second pipelines (e.g., in a separate pipeline that is executed prior to the first and/or second pipelines), can be used to lock (e.g., restrict access to) one or more fragments of a table stored in memory, which can prevent operators (e.g., such as the first scan operator 410) from reading and/or writing to the fragment being accessed. In some implementations, the lock operator 470 can use handle(s) to lock fragment(s), such that data from the fragment(s) can be retrieved from and/or stored within memory without parallel access by another operator which can alter the data and/or consequentially retrieve out of date information. Although fragments are described, other portions of memory, such as a portion of a fragment or multiple fragments, can be utilized.

During generation of the query plan 400, the lock operator 470 can be identified as sharing one or more states with one or more of the other operators in the query plan 400, and the query optimizer 110 (or some other component/procedure) can mark the one or more identified states as shared. For example, as illustrated, the first scan operator 410 can utilize a corresponding fragment handles state 415, the first materialize operator 420 can utilize a corresponding fragment handles state 425, the second scan operator 430 can utilize a corresponding fragment handles state 435, and/or the second materialize operator 440 can utilize a corresponding fragment handles state 445. One or more of these fragment handles states 415, 425, 435, 445 can be identified as shared states with the lock operator 470 and/or can be marked as shared within the query plan 400.

A fragment handle state 415, 425, 435, 445 can correspond to one or more fragments of memory that includes information required by a corresponding operator. For example, during the execution of the query plan 400, the lock operator 470 can lock/allow access to the fragment(s) corresponding to the fragment handles 415 such that information required by the first scan operator 410 can be retrieved. If the first scan operator 410 needs to access a fragment, then the first scan operator 410 can consult the fragment handles 415 to determine whether it is allowed to do so, as the first scan operator 410 may need to access a storage layer. Similarly, the first materialize operator 420 may need to access the storage layer. During the access time, at least some operators/processes can be locked out of accessing the fragment(s) that the lock operator 470 has locked. In some aspects, locking a fragment can prevent a merge (e.g., delta merge) and/or an unload of the fragment from memory. The fragment handles state 415 can include information regarding whether/which handle(s) are locked, such that the scan operator 410, for example, does not perform/attempt to perform prohibited actions while the fragment(s) are locked. Once the fragment(s) are unlocked, the scan operator 410, for example, can access/manipulate data within the fragment(s) and/or lock the fragment during this time.

Accessing information and/or storing it in a shared state before it is required by a subsequent operator can simplify processing of a query, reduce the amount of memory accesses required, decrease the processing resources required to execute a query, and/or decrease the processing time of a query. For example, in some implementations, one or more of the states can be stored within a cache or memory (e.g., within a heap, main memory, etc.). If the states remain in the cache/memory, then a subsequent operator (e.g., an operator other than the operator which added the state to the cache/memory) which accesses the cache/memory does not need to access the state from a database or recalculate the information contained in the state itself. Doing so can increase memory locality. In some aspects, the memory allocated for each state (or multiple states) can be contiguous, which can help to increase memory locality and/or decrease the occurrence of cache misses. Additionally, controlling when states are generated, where they are stored, and/or when information is stored within the states before an operator needs the state can help to control when/how many memory/database accesses are made during query execution.

In some implementations, each of the fragment handles states 415, 425, 435, 445 can be different and/or or correspond to different fragments in a database, and in other implementations, at least some of the fragment handles states 415, 425, 435, 445 can be the same and/or or correspond to the same fragments in a database. For example, in some aspects, the first scan operator 410 and the first materialize operator 420 can require information from the same fragment(s) of memory. In some aspects, the first scan operator 410 and the second scan operator 430 can require information from the same fragment(s) of memory. In some aspects, the first scan operator 410 and/or the second scan operator 430 can scan for information within different fragments of memory. Accordingly, the lock operator 470 may not need to lock the fragment handles state 415 (corresponding to the first scan operator 410) when the second scan operator 430 is accessing information from the corresponding fragment handles 435. Access to the corresponding fragments can be controlled and/or the information required by the operators can be provided before it is used by the operators, as described herein.

As further illustrated, the filter operator 452, the first group local operator 454, and/or the second group local operator 456 can be part of a single operator 450. In the illustrated implementation, the single operator 450 could be used instead of six different operators, as each of the first and second pipelines can otherwise utilize three separate operators 452, 454, 456. In some aspects, this can mean that during plan generation, one operator can be added to the plan instead of individually adding six (or any number) operators. In some implementations, the more often this occurs, the lower the amount of code/time required to generate a plan.

As further illustrated, each of the first group local operator 454, the second group local operator 456, and/or the group merge operator 460 can share a hash table state 458. The hash table state 458 can be marked as a shared state of each of these operators, and can be utilized to hold data that is generated during execution of the query plan 400. For example, the first group local operator 454 can store results in the hash table state 458, the second group local operator 456 can utilize information already stored in the hash table state 458 (e.g., by the first group local operator 454), and/or the second group local operator 456 can store information in the hash table state 458 (e.g., in addition to and/or in place of information already stored in the hash table state 458). The group merge operator 460 can utilize information stored in the hash table state 458 and/or generate results (e.g., to the query or for additional operators and/or pipelines to process). In this manner, the first and/or second pipelines can share information with another pipeline through the use of shared states, which can increase memory locality, decrease memory latency, and/or decrease processing time.

Figure 5:
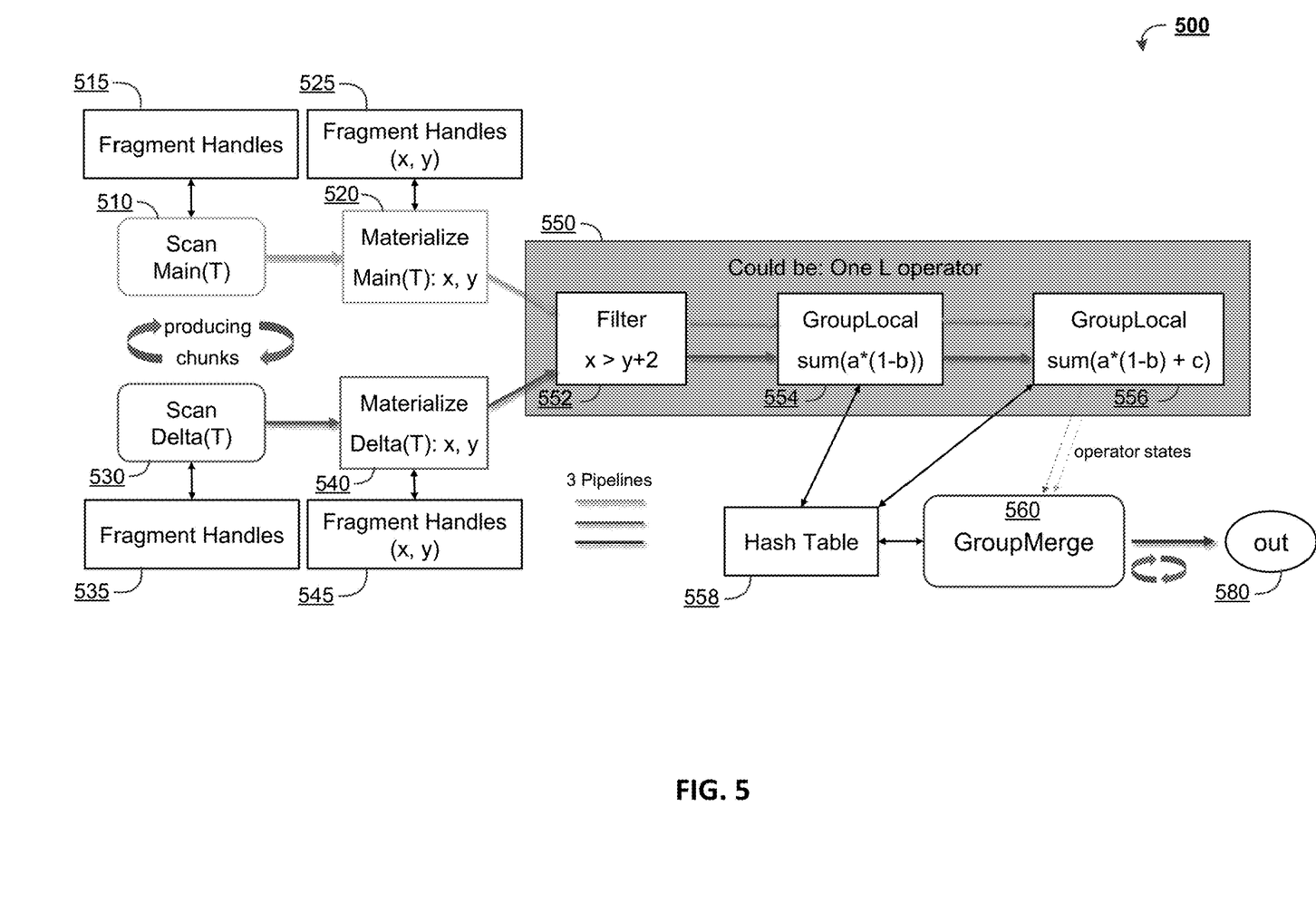
FIG. 5 depicts a block diagram of another example query plan using shared states, in accordance with some example implementations.

For example, FIG. 5 depicts a block diagram of an example query plan 500 using shared states, in accordance with some example implementations. In some aspects, the query plan 500 can be generated based upon the query "select x, y, sum(a*(1−b)), sum(a*(1−b)+c) from T where x>y+2 group by x, y". Although not illustrated, the query plan 500 can include an initial pipeline which includes a lock operator that shares one or more states with a first scan operator 510, a first materialize operator 520, a second scan operator 530, and/or a second materialize operator 540. These shared states can be used to control access to one or more fragments of a database and/or provide information for one or more of the operators in the query plan 500 before the operator needs the information.

As illustrated, the first scan operator 510 can scan table T and/or continually produce chunks (e.g., at least a portion of the data from table T which satisfies the first scan operator 510). These chunks can be provided to the first materialize operator 520, which can materialize results from table T (e.g., based on x and y). The materialized results can be provided to the filter operator 552, which can filter the results based upon "x>y+2". The filtered results can be provided to the first group local operator 554, which can group "sum(a*(1−b))" based upon x and y. These grouped results can be stored within the hash table 558. The pipeline can continue to the second group local operator where "sum(a*(1−b)+c)" can be grouped based upon x and y. These grouped results can be stored within the hash table 558. Each of these operators can be part of the top pipeline.

A similar process can occur through the bottom pipeline. For example, chunks can be generated by a second scan operator from table T based on the delta from the portion of table T scanned by the first scan operator 510. These chunks can be pushed through the bottom pipeline, which includes the second materialize operator 540, the filter operator 522, the first group local operator 554, and the second group local operator 556.

Thereafter, the query execution plan 400 can continue at a final pipeline, where the group merge operator 560 can use the information from the hash table 558 to generate output results 580. In some embodiments, the output results 580 can be generated in chunks. The top, bottom, and final pipeline can continually push chunks of data through the pipeline until all of the required data is processed. In some aspects, the top and bottom pipelines can continually push chunks of data through, and after all of the required data is processed, then control can move to the final pipeline, which continually processes the chunks of data that form the output results 580.

Although a specific arrangement of operations and pipelines are illustrated and described, there is no requirement that the pipelines (or the operators contained therein) be defined and/or executed in a specific order, as the order can be altered and/or additional or less pipelines/operations can be present in some implementations. Although specific operators are illustrated and described, such as scan, materialize, filter, group, group local, merge, group merge, join, hash join, table scan, etc., other operators are possible. Similarly, although specific data structures of states are illustrated and described, such as tables, hash tables, handles, fragment handles, etc., other data structures are possible, such as maps, numbers, vectors, pointers, strings, some combination thereof, and/or the like. Although several systems, methods, operators, procedures, etc. are described with respect to pipelining, one or more of the aspects described herein can be implemented outside of a pipeline.

Figure 6:
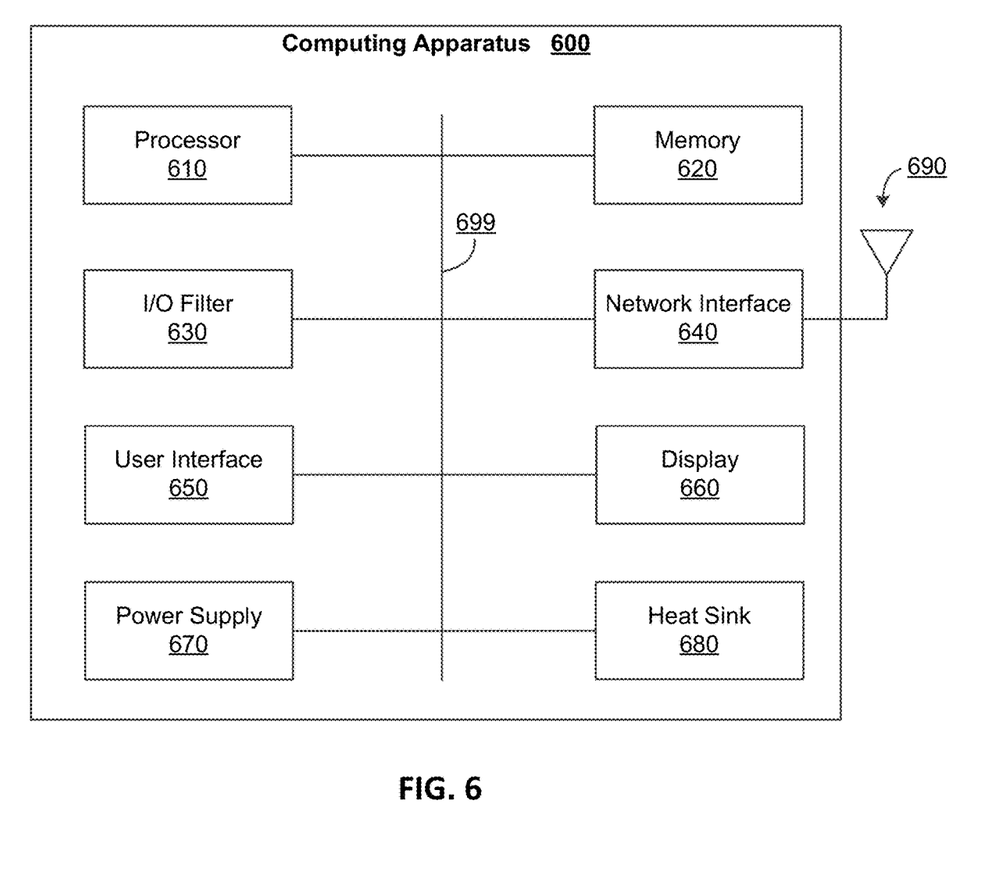
FIG. 6 depicts a block diagram of an example computing apparatus, in accordance with some example implementations.

FIG. 6 illustrates an example computing apparatus 600 which may be used to implement one or more of the described devices and/or components, in accordance with some example implementations. Similarly, the computing apparatus 600 may perform one or more of the processes described herein. In some aspects, at least a portion of the computing apparatus 600 can form at least a portion of the client user equipment 102A-N, the interfaces to other execution engines 112C-D, the database execution engine 150, and/or the databases 190A-N.

As illustrated, computing apparatus 600 may include one or more processors such as processor 610 to execute instructions that may implement operations consistent with those described herein. Apparatus 600 may include memory 620 to store executable instructions and/or information. Memory 620 may include solid-state memory, solid-state disk drives, magnetic disk drives, or any other information storage device. Apparatus 600 may include one or more network interfaces, such as network interface 640, which can be configured to communicate over wired networks and/or wireless networks. Wireless networks may include WiFi, WiMax, Bluetooth, and cellular networks (2G/3G/4G/5G), and/or any other wireless network. In order to effectuate wireless communications, the network interface 640, for example, may utilize one or more antennas, such as antenna 690.

Apparatus 600 may include one or more user interface, such as user interface 650. The user interface 650 can include hardware or software interfaces, such as a keyboard, mouse, or other interface, some of which may include a touchscreen integrated with a display 660. In various implementations, the user interface 650 can include one or more peripheral devices and/or the user interface 650 may be configured to communicate with these peripheral devices.

The apparatus 600 may also comprise an input and output filter 630, which can filter information received from and/or transmitted to a user interface 650, a network interface 640, and/or the like. The apparatus 600 may be powered through the use of one or more power sources, such as power source 670. One or more of the components of the apparatus 600 may be cooled off through the use of one or more heat sinks, such as heat sink 680. As illustrated, one or more of the components of the apparatus 600 may communicate and/or receive power through a system bus 699.

In some implementations, the computing apparatus 600 can be used to implement at least a portion of a database management system. In some aspects, a database management system may be a hardware and/or software system for receiving, handling, optimizing, and/or executing database queries. In some aspects, a database, as referred to herein, can be a structured, organized collection of data, such as schemas, tables, queries, reports, views, and/or the like, which may be processed for information. A database may be physically stored in a hardware server or across a plurality of hardware servers. In some aspects, a database management system may be a hardware and/or software system that interacts with a database, users, and/or other software applications for defining, creating, updating the structured data, and/or for receiving, handling, optimizing, and/or executing database queries.

For example, the computing apparatus 600 can provide one or more features of a high-level programming software system or other software that includes database management features. The computing apparatus 600 can also aggregate or otherwise provide a gateway via which users can access functionality provided by one or more external software components. One or more client machines can access the computing apparatus 600, either via a direct connection, a local terminal, or over a network (e.g. a local area network, a wide area network, a wireless network, the Internet, or the like).

The computing apparatus 600 can be configured to access a database that includes at least one table, which can in turn include at least one column. The database table can store any kind of data, potentially including but not limited to definitions of scenarios, processes, and one or more configurations as well as transactional data, metadata, master data, etc. relating to instances or definitions of the scenarios, processes, and one or more configurations, and/or concrete instances of structured data, such as objects that are relevant to a specific instance of a scenario or a process, and the like. The database can be external to the computing apparatus 600 or may be part of the computing apparatus 600 (e.g., at least partially stored in the memory 620). In some aspects, the memory 620 may be utilized to store at least a portion of a database and/or function as an in-memory database.

For example, a processor 610, a network interface 640, and/or a user interface 650 may be configured to receive and/or load a database table or other comparable data set, into the memory 620 (e.g., in response to receipt of a query instantiated by a user or computer system through one or more client machines, external software components, core software platforms, and/or the like).

Figure 7:
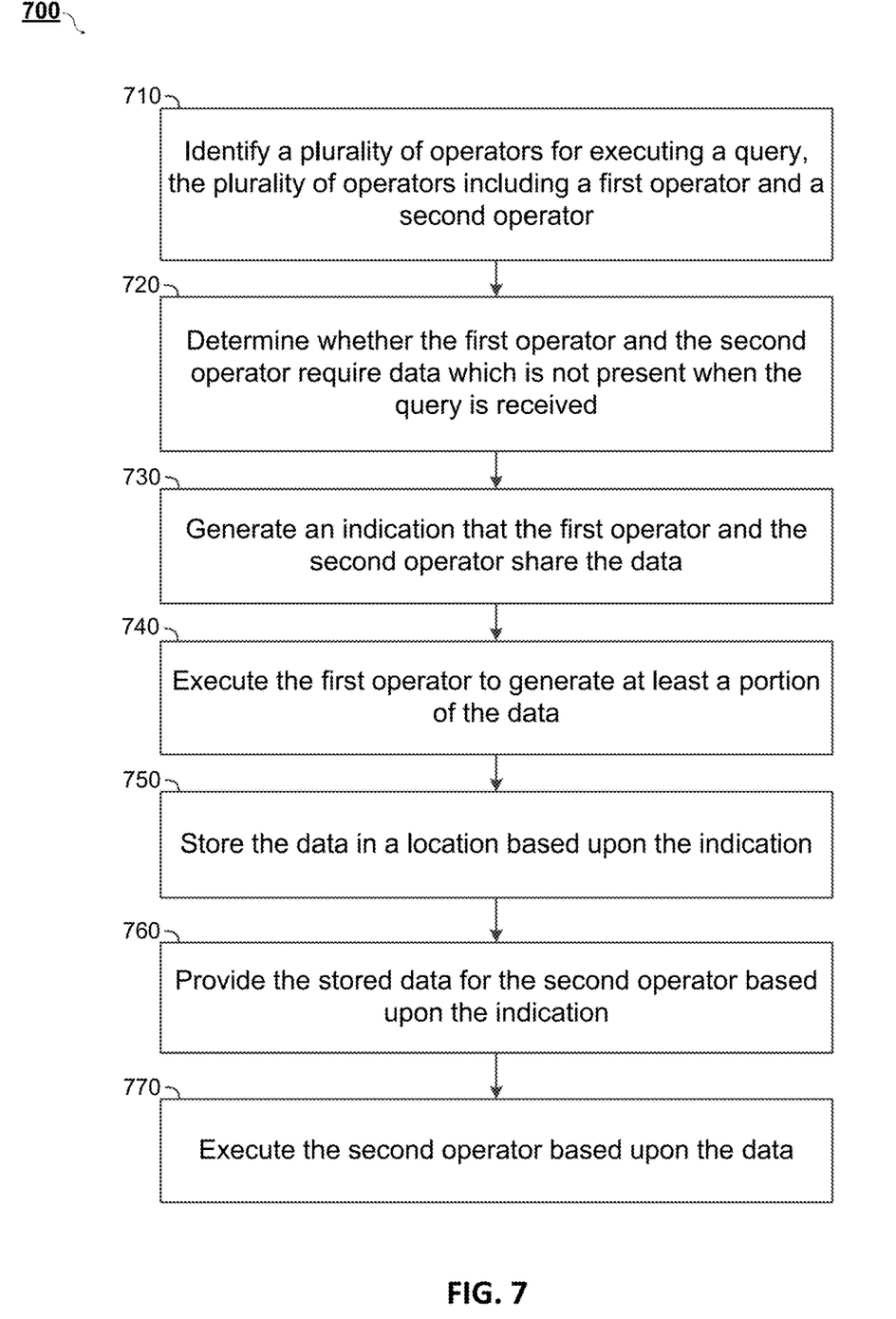
FIG. 7 depicts an example of a method for database query planning and/or execution, in accordance with some example implementations.

FIG. 7 depicts an example of a method 700 for database query planning and/or execution, in accordance with some example implementations. At least a portion of the method 700 can be performed by a computing apparatus 600, which can form at least a portion of a database execution engine 150.

As illustrated, the method 700 can begin at operational block 710, where the computing apparatus 600, for example, can identify a plurality of operators for executing a query, the plurality of operators including a first operator and a second operator. In some implementations, the query can be received from an application separate from the database execution engine 150, for example.

The method 700 can proceed to operational block 720, where the computing apparatus 600, for example, can determine whether the first operator and the second operator require data which is not present when the query is received. In some implementations, the first operator can be included in a first query execution pipeline and/or the second operator can be included in a second query execution pipeline. In some aspects, the second query execution pipeline can begin at, or after an end of, the first query execution pipeline. In some aspects, the data can include a data table or a portion thereof.

The method 700 can proceed to operational block 730, where the computing apparatus 600, for example, can generate an indication that the first operator and the second operator share the data. In some implementations, the first operator can be generated based on a first coded class definition, and/or the first coded class definition can be defined to include a first state indicating that the data is required. In related implementations, the second operator can be generated based on a second coded class definition, and/or the second coded class definition can be defined to include a second state indicating that the data is required. The indication can comprise an indication that the first state and the second state are shared (e.g., that both operators use the same data which is not known prior to execution of the query).

The method 700 can proceed to operational block 740, where the computing apparatus 600, for example, can execute the first operator to generate at least a portion of the data. In some implementations, at least a portion of the plurality of operators can be split among a plurality of pipelines including a first pipeline and a second pipeline. The plurality of pipelines can be executed in a determined order and/or generate results responsive to the query. Executing the first pipeline, for example, can comprise iteratively generating one or more blocks of data based upon operations contained within the first pipeline and/or storing the one or more blocks as intermediate results for the second pipeline.

The method 700 can proceed to operational block 750, where the computing apparatus 600, for example, can store the data in a location based upon the indication. For example, the data can be stored within a cache and/or a heap memory. In some aspects, the first operator can initiate and/or control the storage of the data.

The method 700 can proceed to operational block 760, where the computing apparatus 600, for example, can provide the stored data for the second operator based upon the indication. Providing the stored data for the second operator can include providing access to the cache and/or heap memory.

The method 700 can proceed to operational block 770, where the computing apparatus 600, for example, can execute the second operator based upon the data. In some aspects, data can be removed from the cache and/or heap memory after it is consumed by the second operator.

In some implementations, method 700 can additionally or alternatively include the computing apparatus 600, for example, generating a query plan for execution of the query, the query plan comprising the plurality of operators and the indication. In some aspects, a database execution engine can be configured to provide query optimization of the query plan and/or select other execution engines to handle certain queries.

In this way, the database execution engine 150 can perform complex operations which share information necessary for and/or produced by execution of a query, while also pipelining execution.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The illustrated methods are exemplary only. Although the methods are illustrated as having a specific operational flow, the order of the operations may be altered, two or more operations may be combined into a single operation, a single operation may be performed in two or more separate operations, one or more of the illustrated operations may not be present in various implementations, and/or additional operations which are not illustrated may be part of the methods.

What is claimed is:

1. A system comprising:
   at least one data processor; and
   at least one memory storing instructions which, when executed by the at least one data processor, result in operations comprising:
     receiving, by a database execution engine, a query from a client device;
     identifying, by the database execution engine, a plurality of operators of a query plan for executing a query, the plurality of operators including a first operator and a second operator, the database execution engine including a first interface to one or more client devices, a second interface to one or more databases, and a third interface to at least one other database execution engine, the database execution engine including a query optimizer and a query execution engine separate from the one or more databases;
     generating, by the database execution engine and based on a first coded class definition, the first operator;
     generating, by the database execution engine and based on a second coded class definition, the second operator of a second query execution pipeline;
     generating, by the database execution engine and based on the first coded class definition and the second coded class definition, an indication that the first operator and the second operator share first data, the first data being intermediate result data generated during execution of the query plan and not available at a persistent layer of the one or more databases when the query is initially received;
     executing, by the database execution engine, the first operator to generate at least a portion of the first data;
     storing, by the database execution engine, the first data in a hash table rather than store the first data in a database table at the persistent layer of the one or more databases; and
     providing, by the database execution engine and based upon the indication, to the second operator of the second query execution pipeline the first data from the hash table, the first data serving as input data for execution of the second operator.

2. The system of claim 1, wherein the first operator is included in a first query execution pipeline and the second operator is included in the second query execution pipeline which begins at, or after an end of, the first query execution pipeline.

3. The system of claim 1, wherein the second operator stores output data in the hash table to provide input to a third operator in another query execution pipeline, and wherein executing the first query execution pipeline comprises iteratively generating one or more blocks of data based upon operations contained within the first query execution pipeline and storing the one or more blocks as intermediate results in a corresponding hash table for the second query execution pipeline.

4. The system of claim 1, wherein the first coded class definition is defined to include a first state indicating that the first data is required for execution of the first operator, wherein the second coded class definition is defined to include a second state indicating that the first data is required for execution of the second operator, and wherein the first coded class definition and the second coded class definition further share a common lock to lock access to a fragment in the database table at the persistent layer of the one or more databases.

5. The system of claim 1, wherein the first data is removed from the predetermined memory location hash table after it is consumed by the second operator.

6. The system of claim 1, wherein the first operator initiates or controls the storage of the first data.

7. The system of claim 1, wherein the database execution engine is configured to provide query optimization of the query plan and select a plan execution engine from among the plurality of plan execution engines to handle certain queries.

8. A method comprising:
   receiving, by a database execution engine, a query from a client device;
   identifying, by the database execution engine, a plurality of operators of a query plan for executing a query, the plurality of operators including a first operator and a second operator, the database execution engine including a first interface to one or more client devices, a second interface to one or more databases, and a third interface to at least one other database execution engine, the database execution engine including a query optimizer and a query execution engine separate from the one or more databases;
   generating, by the database execution engine and based on a first coded class definition, the first operator;
   generating, by the database execution engine and based on a second coded class definition, the second operator of a second query execution pipeline;
   generating, by the database execution engine and based on the first coded class definition and the second coded class definition, an indication that the first operator and the second operator share first data, the first data being intermediate result data generated during execution of the query plan and not available at a persistent layer of the one or more databases when the query is initially received;
   executing, by the database execution engine, the first operator to generate at least a portion of the first data;
   storing, by the database execution engine, the first data in a hash table rather than store the first data in a database table at the persistent layer of the one or more databases; and
   providing, by the database execution engine and based upon the indication, to the second operator of the second query execution pipeline the first data from the hash table, the first data serving as input data for execution of the second operator.

9. The method of claim 8, wherein the second operator stores output data in the hash table to provide input to a third operator in another query execution pipeline, and wherein executing the first query execution pipeline comprises iteratively generating one or more blocks of data based upon operations contained within the first query execution pipeline and storing the one or more blocks as intermediate results in a corresponding hash table for the second query execution pipeline.

10. The method of claim 8, wherein the first coded class definition is defined to include a first state indicating that the first data is required for execution of the first operator, wherein the second coded class definition is defined to include a second state indicating that the first data is required for execution of the second operator, and wherein t the first coded class definition and the second coded class definition further share a common lock to lock access to a fragment in the database table at the persistent layer of the one or more databases.

11. A non-transitory computer program product storing instructions which, when executed by at least one data processor, causes operations comprising:

receiving, by a database execution engine, a query from a client device;

identifying, by the database execution engine, a plurality of operators of a query plan for executing a query, the plurality of operators including a first operator and a second operator, the database execution engine including a first interface to one or more client devices, a second interface to one or more databases, and a third interface to at least one other database execution engine, the database execution engine including a query optimizer and a query execution engine separate from the one or more databases;

generating, by the database execution engine and based on a first coded class definition, the first operator;

generating, by the database execution engine and based on a second coded class definition, the second operator of a second query execution pipeline;

generating, by the database execution engine and based on the first coded class definition and the second coded class definition, an indication that the first operator and the second operator share first data, the first data being intermediate result data generated during execution of the query plan and not available at a persistent layer of the one or more databases when the query is initially received;

executing, by the database execution engine, the first operator to generate at least a portion of the first data;

storing, by the database execution engine, the first data in a hash table rather than store the first data in a database table at the persistent layer of the one or more databases; and providing, by the database execution engine and based upon the indication, to the second operator of the second query execution pipeline the first data from the hash table, the first data serving as input data for execution of the second operator.

12. The non-transitory computer program product of claim 11, wherein the second operator stores output data in the hash table to provide input to a third operator in another query execution pipeline, and wherein executing the first query execution pipeline comprises iteratively generating one or more blocks of data based upon operations contained within the first query execution pipeline and storing the one or more blocks as intermediate results in a corresponding hash table for the second query execution pipeline.

13. The non-transitory computer program product of claim 11, wherein the first coded class definition is defined to include a first state indicating that the first data is required for execution of the first operator, wherein the second coded class definition is defined to include a second state indicating that the first data is required for execution of the second operator, and wherein t the first coded class definition and the second coded class definition further share a common lock to lock access to a fragment in the database table at the persistent layer of the one or more databases.

* * * * *